(12) United States Patent  (10) Patent No.: US 8,979,436 B2
Goodman  (45) Date of Patent: Mar. 17, 2015

(54) WATER CRAFT BUMPER

(71) Applicant: Toby Michael Goodman, Kerens, TX (US)

(72) Inventor: Toby Michael Goodman, Kerens, TX (US)

( * ) Notice: Subject to any disclaimer, the term of this patent is extended or adjusted under 35 U.S.C. 154(b) by 0 days.

(21) Appl. No.: 13/841,182

(22) Filed: Mar. 15, 2013

(65) Prior Publication Data

US 2014/0270977 A1 Sep. 18, 2014

(51) Int. Cl.
 *E02B 3/26* (2006.01)
(52) U.S. Cl.
 CPC .......................... *E02B 3/26* (2013.01)
 USPC ............................. 405/212; 405/215; 405/216
(58) Field of Classification Search
 USPC ................................... 405/211–216
 See application file for complete search history.

(56) References Cited

U.S. PATENT DOCUMENTS

| | | | | |
|---|---|---|---|---|
| 1,435,311 | A * | 11/1922 | Knight | 138/110 |
| 3,104,875 | A * | 9/1963 | Doyle | 267/140 |
| 3,139,731 | A * | 7/1964 | Liddell | 405/216 |
| 3,279,503 | A * | 10/1966 | Carbone et al. | 138/128 |
| 3,584,464 | A * | 6/1971 | Saadeh et al. | 405/215 |
| 3,831,941 | A * | 8/1974 | Pease | 267/116 |
| 4,072,022 | A * | 2/1978 | Shimizu | 405/216 |
| 4,445,806 | A * | 5/1984 | Crain | 405/216 |
| 4,512,683 | A * | 4/1985 | Cosenza | 405/216 |
| 5,018,471 | A * | 5/1991 | Stevens | 405/211 |
| 5,499,430 | A * | 3/1996 | Strazar | 24/279 |
| 5,518,342 | A * | 5/1996 | Wright et al. | 405/211 |
| 5,562,364 | A * | 10/1996 | Darder-Alomar | 405/215 |
| 6,048,136 | A * | 4/2000 | Denison et al. | 405/211 |
| 7,168,673 | B1 * | 1/2007 | Piemonte et al. | 248/544 |
| 7,617,792 | B1 * | 11/2009 | Pursley | 114/219 |

* cited by examiner

*Primary Examiner* — Tara M. Pinnock
(74) *Attorney, Agent, or Firm* — Hall Estill Attorneys at Law; Daniel P. Dooley

(57) ABSTRACT

A watercraft bumper for a watercraft may include a sleeve to connect to a piling, the sleeve being detachably connected to the piling, the sleeve having a slit to open and close to detachably connect to the piling, the slit being in communication with a central aperture to cooperate with the piling, and the sleeve including a biasing device to open and close the slit.

14 Claims, 3 Drawing Sheets

WATER CRAFT BUMPER

FIELD OF THE INVENTION

The present invention is directed toward a device for protecting boats and similar watercraft at a dock from water damage due to the rising and lowering water levels.

BACKGROUND

As is well known in the art, severe damage can be caused to boats and similar watercraft as a result of the changing water levels while positioned next to support pilings. A large amount of docks are located in water affected by the tides and/or affected by rising and dropping water due to other causes such as rains. This movement of the watercraft has a significant consequence of seriously damaging the watercraft which may cause expensive and time-consuming repairs.

U.S. Pat. No. 4,072,022 discloses an apparatus for protecting a bridge pillar which comprises a protecting cylinder/sleeve adapted to be mounted outside said bridge pillar so as to surround the latter, a plurality of elastic connecting rods for interconnecting said bridge pillar and said protecting cylinder, said connecting rods being connected to said bridge pillar so that they may be pivoted in every direction; and a float mounted on or in said protecting cylinder/sleeve for floating it in water, in such a manner that at least half of said protecting cylinder is immersed in water.

U.S. Pat. No. 4,512,683 discloses a sleeve adapted to float in water and to surround a piling to protect the same from being lifted by ice including an outer corrugated casing which can be easily gripped by ice forming therearound. Within the casing is a layer of waterproof cementitious material followed by a layer of closed cell foam plastic. The innermost surface of the sleeve, which faces the piling, is a smooth even layer of polyethylene film. Should ice form in the annular space between the piling and the sleeve, the sleeve can easily slide up or down across the outer surface of the ice without moving the piling.

U.S. Pat. No. 5,018,471 discloses a resilient marine fender for protecting a boat from damage resulting from impact against a boat dock, piling or other marine structure including a fender body having an elongate bumper portion on one side of sufficient resiliency to cushion normal impact of the boat and mounting surface on the opposite side thereof of sufficiently frictional character with respect to the piling for generally non-slipping engagement therewith. Selectively engagable and disengagable strap means at the lateral sides of the fender body encircle the piling for selectively securing the fender body to the piling such that the mounting surface is held in frictional facing contact against the piling. A number of elongate bumper portions can be disposed in side-by-side relation to one another on the fender body and a plurality of strap assemblies can be provided.

SUMMARY

A watercraft bumper for a watercraft may include a sleeve to connect to a piling, the sleeve being detachably connected to the piling, the sleeve having a slit to open and close to detachably connect to the piling, the slit being in communication with a central aperture to cooperate with the piling, and the sleeve including a biasing device to open and close the slit.

The biasing device may include a spring device.

The sleeve may include a casing.

The casing may be filled with foam.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

A protective barrier system installed on piers, docks, and other surfaces that automatically adjusts for varying water levels. The system that contacts the edge of the watercraft is always in the correct position as the watercraft moves up and down as well. The protective barrier is provided with a polyvinyl chloride covering, a foam interior which rests upon a buried steel coil flexible spring. The coil flexible spring ensures that the system returns to the normal starting position as the water levels return to a normal position in one embodiment. These features allow the barrier to adjust up and down by floating with the water. With the system in place, the watercraft contacts the system without causing damage to the dock or the watercraft.

Figures 1, 2:
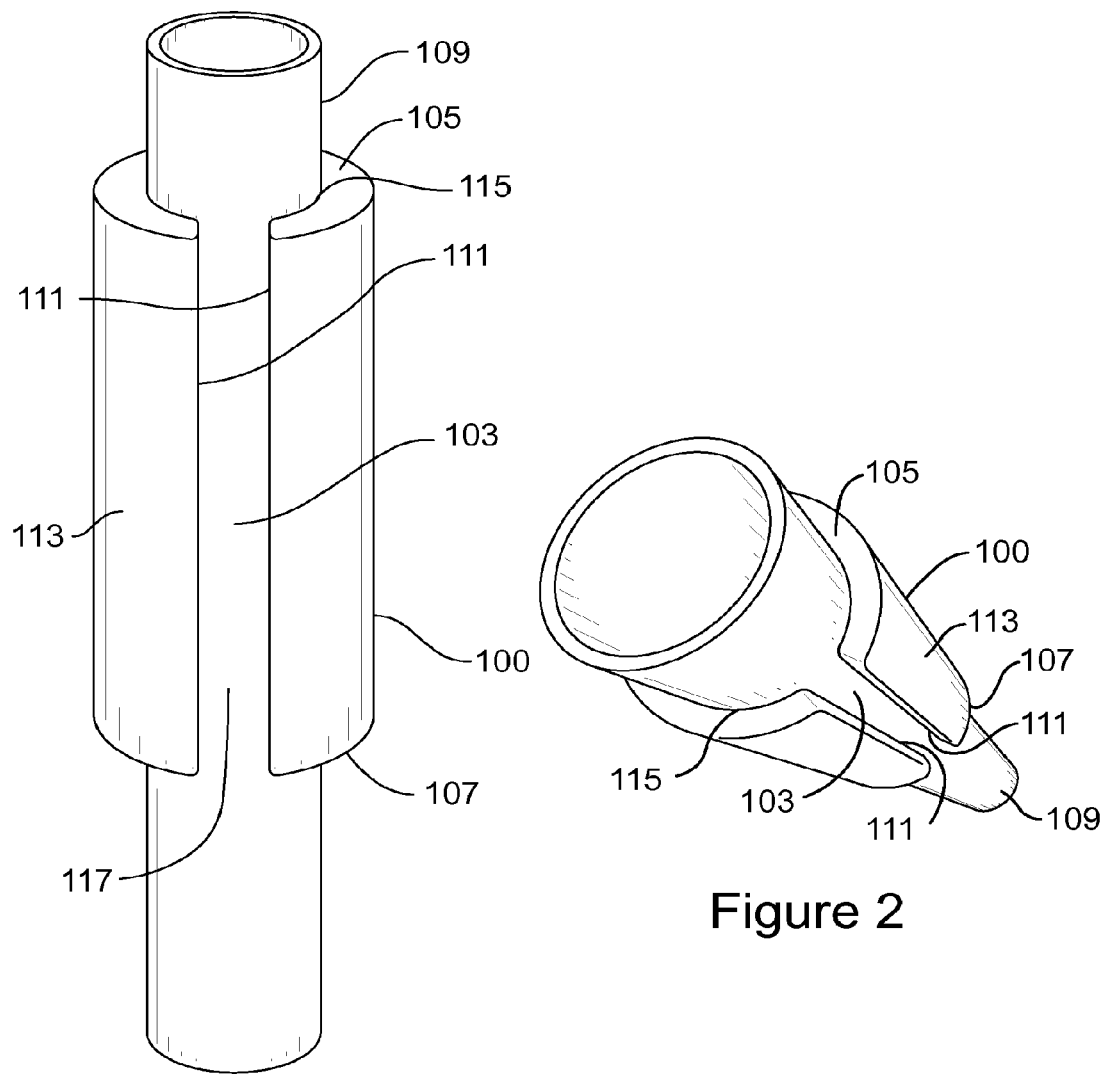
FIG. 1 illustrates a perspective view of the protective device and a piling of the present invention.
FIG. 2 illustrates a perspective view of the protective device in another position with the piling of the present invention.

FIG. 1 illustrates the protective device 100/water craft bumper to protect a watercraft from damage and to move between a first position and a second position in order to maintain a fixed relationship with the watercraft as the water level changes. The protective device 100 may be formed to float on a fluid such as water. Alternatively, the protective device 100 may include a biasing device 121 which forms a clamp to clamp the protective device 100 to the piling 109 to prevent the protective device 100 from moving with respect to the piling 109 as the water level changes.

FIG. 1 illustrates that the protective device 100 may be a discontinuous cylinder/sleeve and may include a vertical slit 103 and which may extend from the top surface 105 to the bottom surface 107 of the protective device 100. The vertical slit 103 may be expandable in order to be placed over the a piling 109 which may be part of a dock and which may be a vertical tube. The vertical slit 105 may be defined by a pair of opposing side surfaces 111 which may connect the top surface 105 to the bottom surface 107 and may connect to the peripheral side surface 113. The peripheral side surface 113 may connect to the side surfaces 111 and connect to the top surface 105 and the bottom surface 107. In addition, the protective device 100 may include a central aperture 115 which may define an interior peripheral surface 117 which may cooperate with the outer surface of the piling 109 and which may connect to the top surface 105, the bottom surface 107 and to the side surface 111.

The protective device 100 may be formed into a polyvinyl casing which may form a mold for receiving a foam material in order to provide a flotation device which may float on the surface of the water. The piling 109 forms a guide for the protective device allowing it to move up and down the piling 109 as the water level changes. Correspondingly, the watercraft moves up and down with the protective device 100 as the water level rises and lowers.

FIG. 2 illustrates that the protective device 100 may be a discontinuous cylinder/sleeve and may include a vertical slit 103 and which may extend from the top surface 105 to the bottom surface 107 of the protective device 100. The vertical slit 103 may be expandable in order to be placed over the piling 109 which may be part of a dock and which may be a vertical tube. The vertical slit 103 may be defined by a pair of opposing side surfaces 111 which may connect the top surface 105 to the bottom surface 107 and may connect to the peripheral side surface 113. The peripheral side surface 113 may connect to the side surfaces 111 and connect to the top surface 105 and the bottom surface 107. In addition, the protective device 100 may include a central aperture 115 which may define an interior peripheral surface 117 which may cooperate with the outer surface of the piling 109 and which may connect to the top surface 105, the bottom surface 107 and to the side surface 111.

The protective device 100 may be formed into a polyvinyl casing which may form a mold for receiving a foam material in order to provide a flotation device which may float on the surface of the water. The piling 109 forms a guide for the protective device allowing it to move up and down the piling 109 as the water level changes. Correspondingly, the watercraft moves up and down with the protective device 100 as the water level rises and lowers.

FIG. 2 additionally illustrates a biasing device 121 which may be positioned within the interior of the protective device 100 and which may be a C shaped biasing device which may be formed from flexible spring steel or other biasing device material. The opening of the C shaped biasing device may cooperate with the vertical slit 103 to allow the vertical slit to be opened and closed around the piling 109 to mount the protective device 100 on the piling 109. The biasing device 121 allows the vertical slit 103 to be opened, increasing the tension on the biasing device 121 to allow the protective device 100 to be placed over the piling 109, and the biasing device 121 closes the vertical slit 103 around the piling.

Alternatively, the protective device 100 may include a biasing device 121 which forms a clamp to clamp the protective device 100 to the piling 109 to prevent the protective device 100 from moving with respect to the piling 109 as the water level changes.

Figure 3:
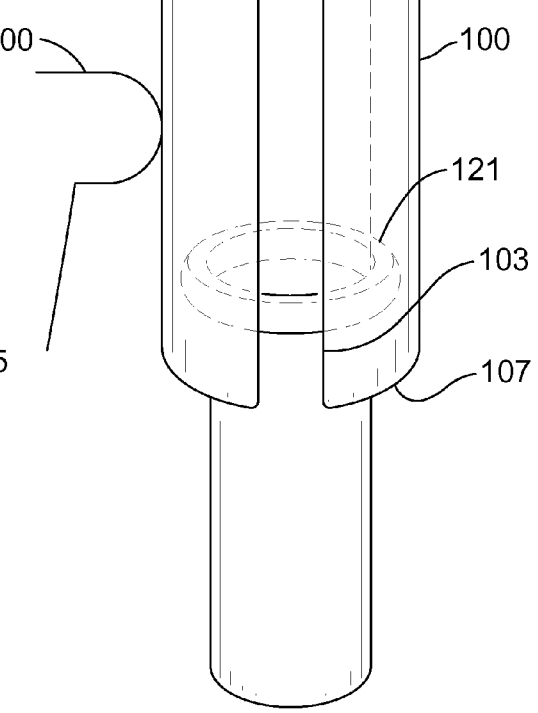
FIG. 3 illustrates a front view of the protective device and piling of the present invention.

FIG. 3 illustrates a front view of the protective device 100 and illustrates that the protective device 100 may be a discontinuous cylinder/sleeve and may include a vertical slit 103 and which may extend from the top surface 105 to the bottom surface 107 of the protective device 100. The vertical slit 103 may be expandable in order to be placed over the piling 109 which may be part of a dock and which may be a vertical tube. The vertical slit 103 may be defined by a pair of opposing side surfaces 111 which may connect the top surface 105 to the bottom surface 107 and may connect to the peripheral side surface 113. The peripheral side surface 113 may connect to the side surfaces 111 and connect to the top surface 105 and the bottom surface 107. In addition, the protective device 100 may include a central aperture 115 which may define an interior peripheral surface 117 which may cooperate with the outer surface of the piling 109 and which may connect to the top surface 105, the bottom surface 107 and to the side surface 111.

The protective device 100 may be formed into a polyvinyl casing which may form a mold for receiving a foam material in order to provide a flotation device which may float on the surface of the water. The piling 109 forms a guide for the protective device allowing it to move up and down the piling 109 as the water level changes. Correspondingly, the watercraft 300 moves up and down with the protective device 100 as the water level rises and lowers.

Figure 4:
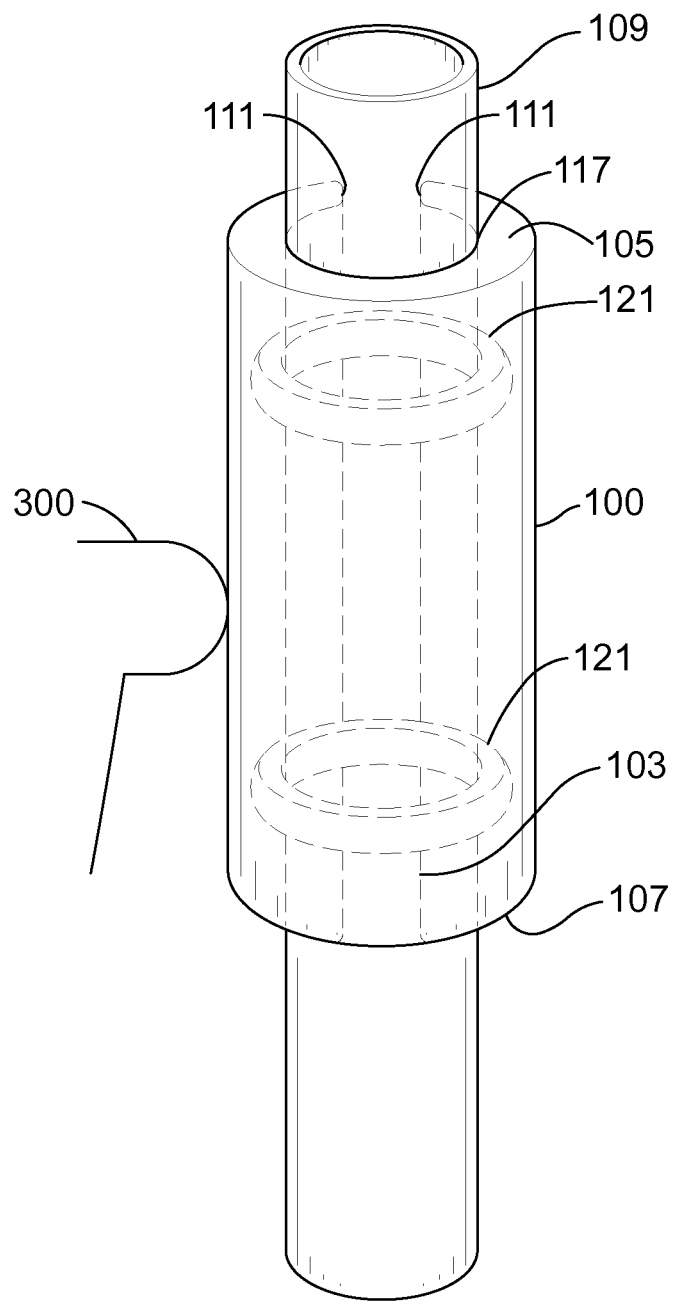
FIG. 4 illustrates a back view of the protective device and piling of the present invention.

FIG. 3 additionally illustrates a biasing device 121 which may be a C shaped biasing device which may be formed from flexible spring steel or other biasing device material. The opening of the C shaped biasing device may cooperate with the vertical slit 103 to allow the vertical slit to be opened and closed around the piling 109 to mount the protective device 100 on the piling 109. The biasing device 121 allows the vertical slit 103 to be opened, increasing the tension on the biasing device 121 to allow the protective device 100 to be placed over the piling 109, and the biasing device 121 closes the vertical slit 103 around the piling FIG. 4 illustrates a back view of the protective device 100 and illustrates that the protective device 100 may be a discontinuous cylinder/sleeve and may include a vertical slit 103 and which may extend from the top surface 105 to the bottom surface 107 of the protective device 100. The vertical slit 103 may be expandable in order to be placed over the piling 109 which may be part of a dock and which may be a vertical tube. The vertical slit 103 may be defined by a pair of opposing side surfaces 111 which may connect the top surface 105 to the bottom surface 107 and may connect to the peripheral side surface 113. The peripheral side surface 113 may connect to the side surfaces 111 and connect to the top surface 105 and the bottom surface 107. In addition, the protective device 100 may include a central aperture 115 which may define an interior peripheral surface 117 which may cooperate with the outer surface of the piling 109 and which may connect to the top surface 105, the bottom surface 107 and to the side surface 111.

The protective device 100 may be formed into a polyvinyl casing which may form a mold for receiving a foam material in order to provide a flotation device which may float on the surface of the water. The piling 109 forms a guide for the protective device allowing it to move up and down the piling 109 as the water level changes. Correspondingly, the watercraft 300 moves up and down with the protective device 100 as the water level rises and lowers.

FIG. 3 additionally illustrates a biasing device 121 which may be a C shaped biasing device which may be formed from flexible spring steel or other biasing device material. The opening of the C shaped biasing device may cooperate with the vertical slit 103 to allow the vertical slit to be opened and closed around the piling 109 to mount the protective device 100 on the piling 109. The biasing device 121 allows the vertical slit 103 to be opened, increasing the tension on the biasing device 121 to allow the protective device 100 to be placed over the piling 109, and the biasing device 121 closes the vertical slit 103 around the piling.

Figure 5:
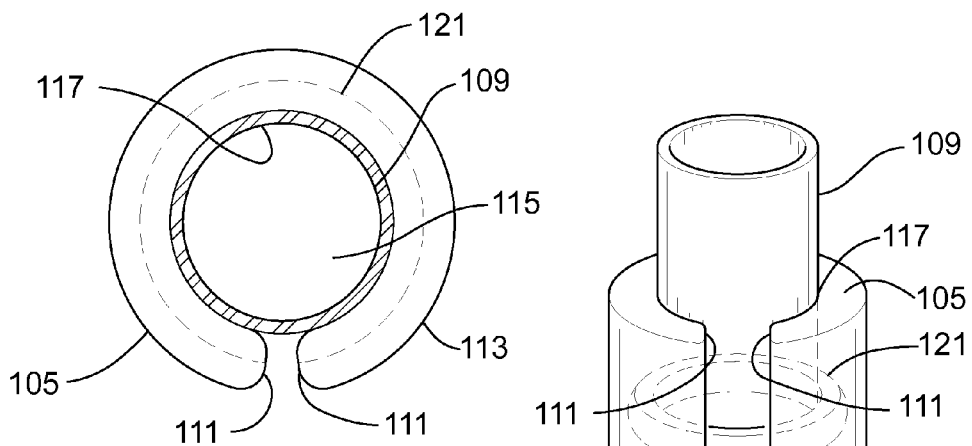
FIG. 5 illustrates a top view of the protective device of the present invention.

FIG. 5 illustrates a top view of the protective device 100 and illustrates the top surface 105, the slit 103, the piling 109, the peripheral side surface 113 and the central aperture 115.

Figure 6:
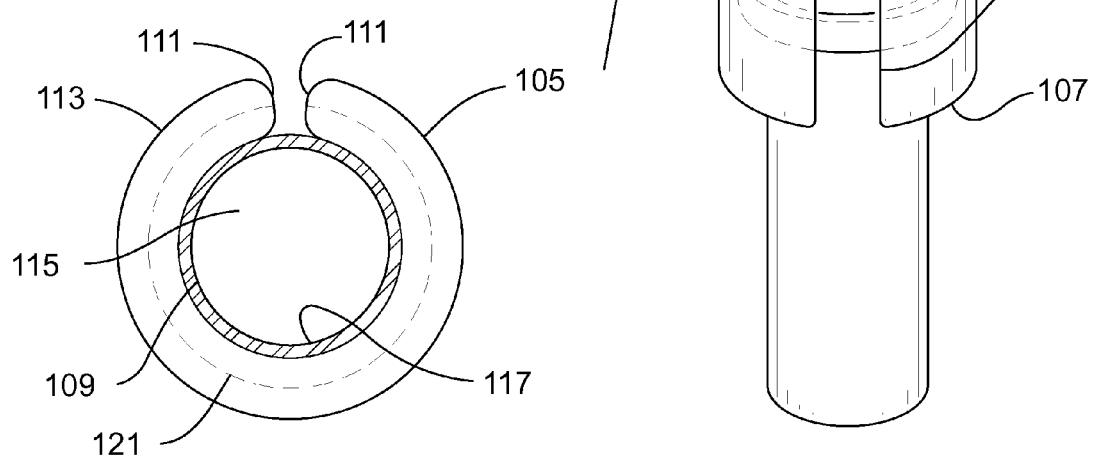
FIG. 6 illustrates a bottom view of the protective device of the present invention.

FIG. 6 illustrates a bottom view of the protective device 100 and illustrates the bottom surface 107, the slit 103, the piling 109, the side surface 111, the peripheral side surface 113 and the central aperture 115.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A watercraft and watercraft combination bumper comprising:
   a stationary structure positioned in a body of water;
   a watercraft adjacent the stationary structure; and
   a protective member in sliding adjacency with and encircling the stationary structure, the protective member disposed between the stationary structure and the watercraft, in which the protective member is exclusively buoyed by the body of water, and wherein the protective member is formed from a polymer, and in which the protective member is free to slide along an entire length of the stationary structure in unison with a change in level of the body of water.

2. The combination of claim 1, further comprising a biasing device supported by the polymer protective member, the biasing device secures the polymer protective member in sliding communication with the stationary structure absent the presence of additional fastening means and wherein the stationary structure is a piling.

3. The combination of claim 2, wherein the piling supports a dock protruding into the body of water.

4. The combination of claim 3, wherein the protective member mitigates contact of the watercraft with the piling.

5. The combination of claim 4, in which the watercraft and the protective member move in unison in response to a change in a depth of the body of water.

6. The combination of claim 5, in which the protective member encircling the piling is in sliding contact with the piling.

7. The combination claim 6, in which the protective member conforms to a shape of the piling.

8. The combination of claim 1, in which the protective member comprises:
   an open proximal end;
   an open distal end;
   a hollow core disposed between the open proximal end and the open distal end; and
   an open slit running an entire length of the protective member, the open slit accommodates mounting of the protective member into the piling.

9. The combination of claim 8, further comprising a biasing device supported by the polymer protective member, the biasing device secures the polymer protective member in sliding communication with the stationary structure absent the presence of additional fastening means and wherein the stationary structure is a piling.

10. The combination of claim 9, wherein the piling supports a dock protruding into the body of water.

11. The combination of claim 10, wherein the protective member mitigates contact of the watercraft with the piling.

12. The combination of claim 11, in which the watercraft and the protective member move in unison in response to a change in a depth of the body of water.

13. The combination of claim 12, in which the protective member encircling the piling is in sliding contact with the piling.

14. The combination of claim 13, in which the protective member conforms to a shape of the piling.

* * * * *